US012589758B2

(12) United States Patent
Chiu

(10) Patent No.: US 12,589,758 B2
(45) Date of Patent: Mar. 31, 2026

(54) DRIVING MONITORING METHOD AND DRIVING RISK EVALUATION SYSTEM

(71) Applicant: Wistron Corporation, New Taipei City (TW)

(72) Inventor: Chih-Hao Chiu, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 77 days.

(21) Appl. No.: 18/597,925

(22) Filed: Mar. 7, 2024

(65) Prior Publication Data

US 2025/0206323 A1 Jun. 26, 2025

(30) Foreign Application Priority Data

Dec. 26, 2023 (TW) .................................. 112150884

(51) Int. Cl.
*B60W 50/00* (2006.01)
*B60W 50/04* (2006.01)
*B60W 50/14* (2020.01)

(52) U.S. Cl.
CPC .......... *B60W 50/045* (2013.01); *B60W 50/14* (2013.01); *B60W 2540/221* (2020.02); *B60W 2540/30* (2013.01)

(58) Field of Classification Search
CPC ............... B60W 50/045; B60W 50/14; B60W 2540/221; B60W 2540/30

USPC .......................................................... 701/32.9
See application file for complete search history.

(56) References Cited

U.S. PATENT DOCUMENTS

| | | | | |
|---|---|---|---|---|
| 10,800,289 | B1 * | 10/2020 | Trim | B60N 2/0027 |
| 11,718,226 | B2 * | 8/2023 | Nagatani | B60W 50/14 |
| | | | | 340/439 |
| 2019/0121356 | A1 * | 4/2019 | Migneco | A61B 5/0205 |
| 2019/0392235 | A1 * | 12/2019 | Shimizu | G06V 20/597 |
| 2021/0009149 | A1 * | 1/2021 | Migneco | B60N 2/0029 |
| 2024/0317253 | A1 * | 9/2024 | Larsson | B60W 50/14 |

FOREIGN PATENT DOCUMENTS

| | | |
|---|---|---|
| CN | 112606837 | 4/2021 |
| CN | 116252785 | 6/2023 |
| TW | 201908997 | 3/2019 |

* cited by examiner

*Primary Examiner* — Mahmoud S Ismail
(74) *Attorney, Agent, or Firm* — JCIPRNET

(57) ABSTRACT

A driving monitoring method and a driving risk evaluation system are provided. In the method, the safety reaction time relative to a vehicle driving status is determined. A risk value is evaluated by inputting the safety reaction time into a cutoff function. The greater the safety reaction time is, the less the risk value corresponding to the cutoff function is. The less the safety reaction time is, the greater the risk value corresponding to the cutoff function is. Therefore, the driver can be reminded at the right moment.

18 Claims, 16 Drawing Sheets

10 driving risk evaluation system

14 storage

141 person detection module

142 vehicle detection module

143 alarm processing module

112 vehicle speed sensor

15 processor

113 physiological sensor

111 distance sensor determine a safety reaction time relative to a vehicle driving status ⌐S210 evaluate a risk value through imputing the safety reaction time to a cutoff function ⌐S220

143

S520

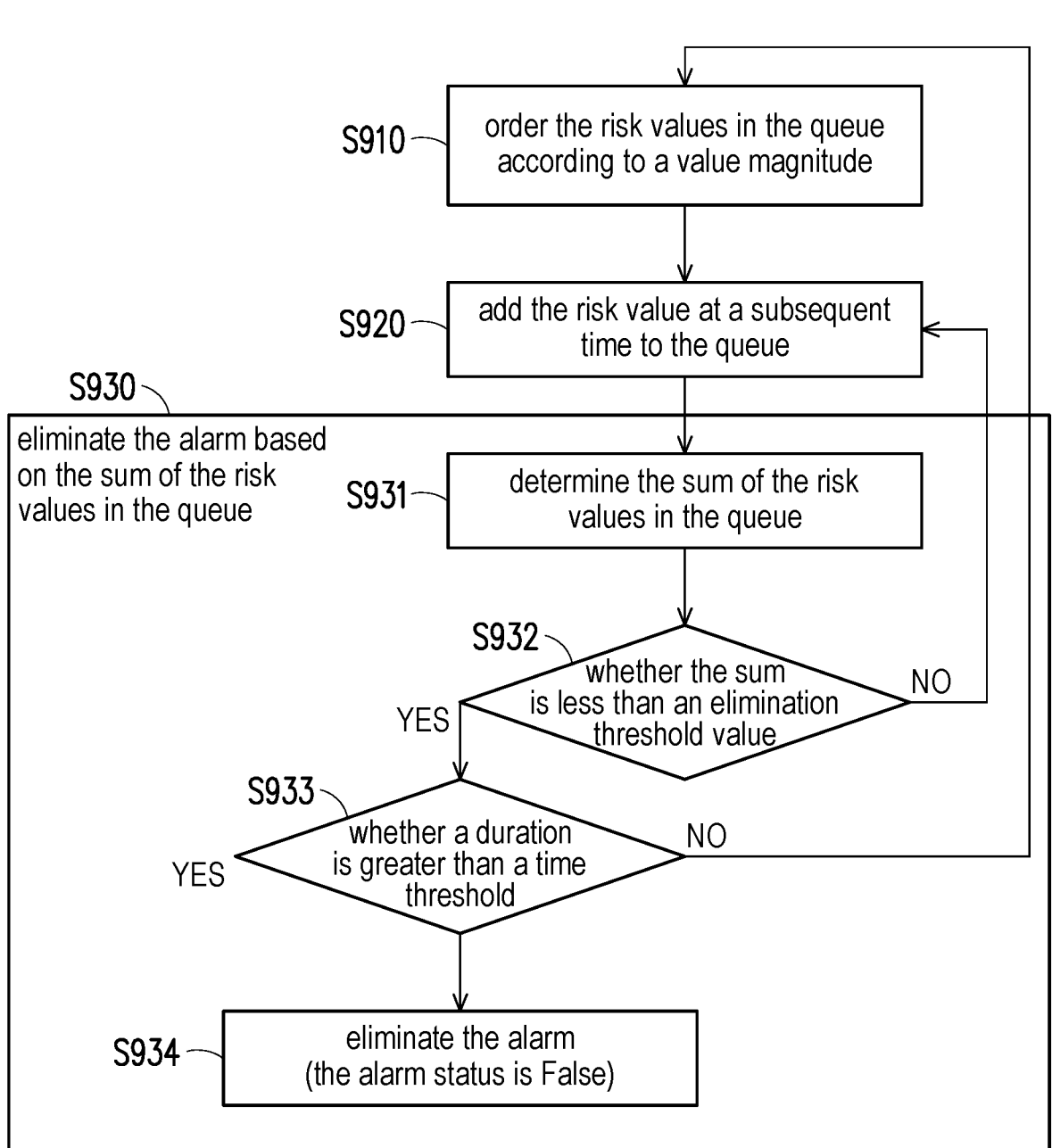

S530

S910 — order the risk values in the queue according to a value magnitude

S920 — add the risk value at a subsequent time to the queue

S930 — eliminate the alarm based on the sum of the risk values in the queue

S931 — determine the sum of the risk values in the queue

S932 — whether the sum is less than an elimination threshold value
   NO
   YES

S933 — whether a duration is greater than a time threshold
   NO
   YES

S934 — eliminate the alarm (the alarm status is False)

DRIVING MONITORING METHOD AND DRIVING RISK EVALUATION SYSTEM

CROSS-REFERENCE TO RELATED APPLICATION

This application claims the priority benefit of Taiwan application no. 112150884, filed on Dec. 26, 2023. The entirety of the above-mentioned patent application is hereby incorporated by reference herein and made a part of this specification.

BACKGROUND

Technical Field

The disclosure relates to a monitoring technology, and in particular to a driving monitoring method and a driving risk evaluation system.

Description of Related Art

While driving a vehicle, accidents may occur due to a poor physiological status of a driver. For example, when a pupil constriction occurs to the driver and the eyes blink more frequently due to fatigue, it is difficult to concentrate and the reaction time may slow down, resulting in a car accident.

On the other hand, existing driving abnormality detection systems may frequently send alarms for minor abnormalities, which is not only annoying but also affects the mood of the driver. For example, during a high-speed driving, the abnormality detection system may trigger an abnormality alarm for the detection of slight physiological fatigue of the driver. However, if the current vehicle position is far away from the ramp or unable to change to a low-speed lane, the continuous warning only makes the driver feel helpless and annoying. Even if the warning system may be turned off, the abnormal status of the driver continues, which only increases the risk.

SUMMARY

The disclosure provides a driving monitoring method and a driving risk evaluation system, which may remind a driver in a timely manner to reduce the occurrence of accidents without disturbing the driver too frequently.

The driving monitoring method of the embodiment of the disclosure includes (but is not limited to) the following steps: determining a safety reaction time relative to a vehicle driving status; and evaluating a risk value through inputting the safety reaction time into a cutoff function. The greater the safety reaction time is, the less the corresponding risk value relative to the cutoff function is, and the less the safety reaction time is, the greater the corresponding risk value relative to the cutoff function is.

The driving risk evaluation system of the embodiment of the disclosure includes (but is not limited to) a sensor, a storage, and a processor. The sensor detects the vehicle driving status. The storage stores a program code. The processor is coupled to the sensor and the storage, loading the program code and executes: determining the safety reaction time relative to the vehicle driving status; and evaluating the risk value through inputting the safety reaction time into the cutoff function. The greater the safety reaction time is, the less the corresponding risk value relative to the cutoff function is, and the less the safety reaction time is, the greater the corresponding risk value relative to the cutoff function is.

Based on the above, the driving monitoring method and the driving risk evaluation system of the embodiments of the disclosure are based on the characteristic that the output value of the cutoff function significantly increases as the input value exceeding the corresponding threshold value decreases. The risk value corresponding to a level of emergency is evaluated based on the safety reaction time. A magnitude of the risk value may be used to determine whether to send an alarm.

To make the aforementioned more comprehensible, several embodiments accompanied with drawings are described in detail as follows.

BRIEF DESCRIPTION OF THE DRAWINGS

FIG. 9 is a flow chart of an alarm elimination process according to the first embodiment of the disclosure.

FIG. 10 is a schematic diagram of an application scenario illustrating an order of the risk values in the queue.

DESCRIPTION OF THE EMBODIMENTS

Figure 1:
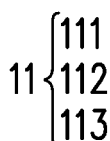
FIG. 1 is a component block diagram of a driving risk evaluation system according to an embodiment of the disclosure.

FIG. 1 is a component block diagram of a driving risk evaluation system 10 according to an embodiment of the disclosure. Referring to FIG. 1, the driving risk evaluation system 10 includes (but is not limited to) a sensor 11, a storage 14, and a processor 15. The driving risk evaluation system 10 may be an in-vehicle system, a mobile device, a wearable device, a tablet computer, an intelligent assistant device, or other electronic devices. In an embodiment, the driving risk evaluation system 10 is installed in a vehicle. The vehicle may be various types of mobile vehicles. For example, a passenger car, a truck, or a bus. In another embodiment, the driving risk evaluation system 10 is externally connected to the vehicle.

In an embodiment, the sensor 11 includes a distance sensor 111.

The distance sensor 111 may be a radar, a lidar, a depth sensor, a time of flight (ToF) sensor, or a stereo camera. In an embodiment, the distance sensor 111 detects a distance between the vehicle (on which the distance sensor 111 is mounted) and another or more vehicles.

In an embodiment, the sensor 11 includes a vehicle speed sensor 112.

The vehicle speed sensor 112 may be a position sensor (for example, through an induced current, a potentiometer, or an optical encoder), a motion sensor (for example, an inertial measurement unit, an accelerometer, and/or a gyroscope), a pressure sensor (for example, microelectromechanical or capacitive), a speed sensor (for example, a Hall effect sensor, a magnetoresistive effect sensor, or a passive sensor), or an electronic control unit (ECU) of the vehicle. In an embodiment, the vehicle speed sensor 112 detects a (moving) speed of the vehicle (on which the vehicle speed sensor 112 is mounted).

In an embodiment, the sensor 11 includes a physiological sensor 113.

The physiological sensor 113 may be an image capturing device or an infrared sensor. In an embodiment, the physiological sensor 113 takes a picture of a person (for example, a driver) on the vehicle (on which the physiological sensor 113 is mounted) to generate a captured image.

The storage 14 may be any type of fixed or removable random access memory (RAM), read only memory (ROM), flash memory, hard disk drive (HDD), solid-state drive (SSD), or similar elements. In an embodiment, the storage 14 is used to store program codes, software modules (for example, a person detection module 141, a vehicle detection module 142, and an alarm processing module 143), configuration configurations, data (for example, speed, distance, time, risk value, or function), or file, and the embodiment thereof will be described in detail later.

The processor 15 is coupled to the sensor 11 and the storage 14. The processor 15 may be a central processing unit (CPU), a graphic processing unit (GPU), or other programmable general-purpose or special-purpose microprocessor, digital signal processor (DSP), programmable controller, field programmable gate array (FPGA), application-specific integrated circuit (ASIC), neural network accelerator, or other similar elements or combinations of the above elements. In an embodiment, one or more processors 15 are used to execute all or part of the operations of the driving risk evaluation system 10, and may load and execute each of the program codes, the software modules, the file, and the information stored in the storage 14. In some embodiments, functions of the processor 15 may be implemented through a software or a chip.

In an embodiment, the processor 15 executes the person detection module 141, the vehicle detection module 142, and/or the alarm processing module 143. The function of each of the modules 141 to 143 will be described in detail in subsequent embodiments.

In the following, the method described in the embodiment of the disclosure will be explained in conjunction with various devices, elements, and modules in the driving risk evaluation system 10. Each process of this method may be adjusted according to the implementation.

Figure 2:
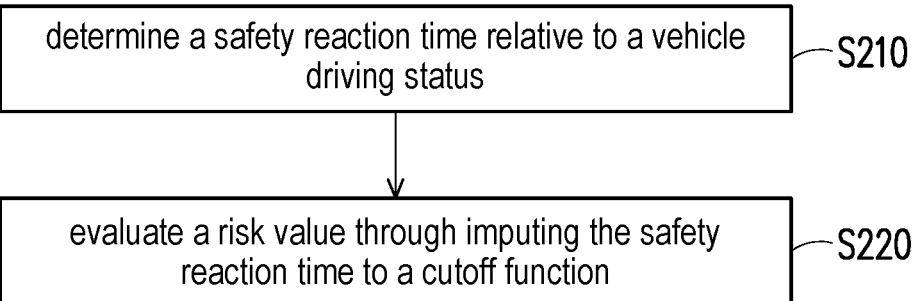
FIG. 2 is a flow chart of a driving monitoring method according to an embodiment of the disclosure.

FIG. 2 is a flow chart of a driving monitoring method according to an embodiment of the disclosure. Referring to FIG. 2, a safety reaction time relative to a vehicle driving status is determined by the processor 15 through the vehicle detection module 142 (step S210). In an embodiment, the safety reaction time includes measuring the speed of the vehicle and the distance between the two vehicles (i.e., the vehicle and another vehicle). For example, the vehicle detection module 142 detects the speed of the vehicle through the vehicle speed sensor 112 and detects the distance to other vehicles through the distance sensor 111.

In an embodiment, the safety reaction time includes a physiological status of the driver. The processor 15 detects the physiological status through the person detection module 141. For example, the processor 15 captures images of the driver (face or other body parts) through the physiological sensor 113, and identifies the physiological status based on an image recognition technology (for example, a deep learning inference or an image feature comparison). Characteristics such as eye color, size of a pupil, position of a pupil, mouth opening to yawn, or number of blinks are used for physiological status.

The physiological status is related to a behavioral ability of the driver to drive the vehicle. In an embodiment, the physiological status is unfocused eyes. For example, looking left and right in a short period of time (for example, 1, 3, or 5 seconds). In an embodiment, the physiological status is that a yawning frequency is higher than the corresponding threshold value. For example, yawning more than 5 times in 1 minute and yawning twice in 10 seconds. In an embodiment, the physiological status is eye redness or pupil constriction. For example, an area ratio of red among three primary colors in an eyeball is greater than a corresponding threshold value; or the pupil constricts by more than 5%. In an embodiment, the physiological status is that a number of blinks is higher than the corresponding threshold. For example, blinking more than twice within 5 seconds; or blinking more than three times within 10 seconds. The above physiological status may be regarded as a slightly abnormal status.

In an embodiment, the physiological status belongs to a severely abnormal status. The serious abnormal status is usually a situation where it is difficult or impossible for the driver to drive. For example, closing the eyes for three seconds, slumping head on a steering wheel, or tilting head continuously.

It should be noted that there are other changes in physiological status, and the content and definition thereof may be adjusted according to actual needs.

In an embodiment, the processor 15 determines the safety reaction time through the vehicle detection module 142 according to the speed of the vehicle and the distance of which from another or more vehicles. In an embodiment, the safety reaction time is the ratio of distance to speed. For example, $$T_{Cur} = \left( \frac{LF}{V_{car} \times \dfrac{1000}{3600}} \right),$$

$T_{Cur}$ is the safety reaction time, LF is the distance (for example, in units of meters, but not limited thereto), and $V_{car}$ is the speed (for example, in units of kilometers per hour, but not limited thereto).

The safety reaction time calculated from a current speed and a current distance (i.e., the distance between the vehicles) may represent the time required to collide with other vehicles. Therefore, the less the safety reaction time is, the shorter the time required to collide with other vehicles is; the greater the safety reaction time is, the longer the time required to collide with other vehicles is.

In other embodiments, the safety reaction time may be a function based on the ratio of distance to speed. For example, the ratio is multiplied by a weighting value, or the ratio is added to an offset value.

Referring to FIG. 2, a risk value is evaluated through imputing the safety reaction time to a cutoff function by the processor 15 using the alarm processing module 143 (step S220). Specifically, one of the properties of the cutoff function is that if an input value is higher than a corresponding threshold value, an output value of the cutoff function has little difference (for example, the difference is less than one or two percent). In other words, the output values corresponding to any two input values greater than the corresponding threshold value has little difference. On the other hand, if the input value is lower than the corresponding threshold value, the output value of the cutoff function increases significantly as the input value decreases. That is to say, the difference between the output values corresponding to any two input values less than the corresponding threshold value is greater than the difference between the output values corresponding to any two input values greater than the corresponding threshold value.

The value of the safety reaction time is used as the input value of the cutoff function. The processor 15 may set: the greater the safety reaction time is, the less the corresponding risk value relative to the cutoff function is; the less the safety reaction time is, the greater the corresponding risk value relative to the cutoff function is. That is to say, if the safety reaction time (representing the time required to collide with other vehicles) calculated from the current speed and the current distance (i.e., the distance between vehicles) is less, the risk value (i.e., the output value of the cutoff function) is greater (a higher chance of triggering the alarm); on the contrary, the greater the safety reaction time is, the less the risk value is or even remain unchanged after exceeding the corresponding threshold value (a lower chance of triggering the alarm).

In an embodiment, the cutoff function is an exponential function. The processor 15 may set an upper limit time and a lower limit time of the safety reaction time. The upper limit time may be based on an upper limit of a detectable vehicle speed and/or a detectable distance. For example, if a maximum supported vehicle speed of the vehicle speed sensor 112 is 200 kilometers, the vehicle may move 200×1000/3600=55.55 meters per second. If a maximum detectable distance between vehicles is 200 meters, it takes 200/55.55=3.6 seconds (which may be used as the upper limit time) for the vehicle to move 200 meters. For the lower limit time, please refer to the definition of safe distance of government agencies or research units. For example, the safe distance (in units of meters) is half of the speed (in units of kilometers/hour). If the speed is 60 kilometers per hour and the safe distance between vehicles is 30 meters, 30/(60*1000/3600)=1.8 seconds may be obtained after calculation. The 1.8 seconds may be set as a starting point for significant changes in the cutoff function (i.e., the corresponding threshold value of the above cutoff function), and the highest point may be reached after 0.2 seconds. The difference is 1.8−0.2=1.6 seconds (which may be used as the lower limit time).

The processor 15 may set a range interval of the risk value. For example, the range intervals are 1 to 100, 1 to 50, or 1 to 500.

Then, the processor 15 may define the exponential function according to the upper limit time, the lower limit time, and the range interval. The upper limit time and the lower limit time are used in the exponential function to normalize the safety reaction time. For example, the safety reaction time is normalized between 0 and 1, but is not limited thereto. The range interval is related to a frequency of detecting the vehicle driving status (e.g., the speed of the vehicle, the distance and/or the physiological status between the vehicle and another vehicle). That is, the frequency of monitoring the vehicle status or the physiological status. For example, the status within the last 10 seconds or 20 seconds is monitored. Alternatively, the range interval is related to an execution frequency of the alarm subsequently triggered based on the risk value. For example, the frequency of calculating the risk value in each second. The higher the frequency is, the less the recommended value range of the range interval is to accumulate the risk values at more time points. For example, assuming that the alarm processing module only calculates the risk value once per second and accumulates ten risk values in the last 10 seconds. When the sum of the accumulated risk values is greater than the trigger threshold value (for example, 60, but may be defined according to the actual application), the alarm is sent, and the range interval may be set to cover the trigger threshold value. For example, the range interval is 1 to 100.

In an embodiment, the exponential function is:

$$I_{Safe} = O_{MIN} + \left( (O_{MAX} - O_{MIN}) \times \left( 1 - \frac{T_{Cur} - T_{MIN}}{T_{MAX} - T_{MIN}} \right)^{ER} \right) \qquad (1)$$

$T_{Cur}$ is the safety reaction time. $T_{MIN}$ is the lower limit time. $T_{MAX}$ is the upper limit time. ER is an exponential rate. $O_{MAX}$ is an upper limit of the range interval. $O_{MIN}$ is a lower limit of the range interval. $I_{safe}$ is the risk value.

The setting of the exponential rate ER may allow the risk value $I_{safe}$ to change rapidly when the safety reaction time $T_{Cur}$ decreases downwards and exceeds the corresponding threshold value (for example, 1.8), but the change of the corresponding risk value $I_{safe}$ may not be overwhelmed before the safety reaction time $T_{Cur}$ value reaches 1.8.

For example, FIGS. 3A to 3F are schematic diagrams illustrating exponential functions CF1 to CF6 with multiple exponential rates according to an embodiment of the disclosure. Referring to FIGS. 3A to 3F, assuming that the lower limit time $T_{MIN}$ is 1.6, the upper limit time $T_{MAX}$ is 3.6, the upper limit $O_{MAX}$ of the range interval is 100, and the lower limit $O_{MIN}$ of the range interval is 1. FIGS. 3A to 3F are the exponential functions CF1 to CF6 with the exponential rates ER of 5, 10, 15, 20, 25, and 30, respectively.

Figure 3A:
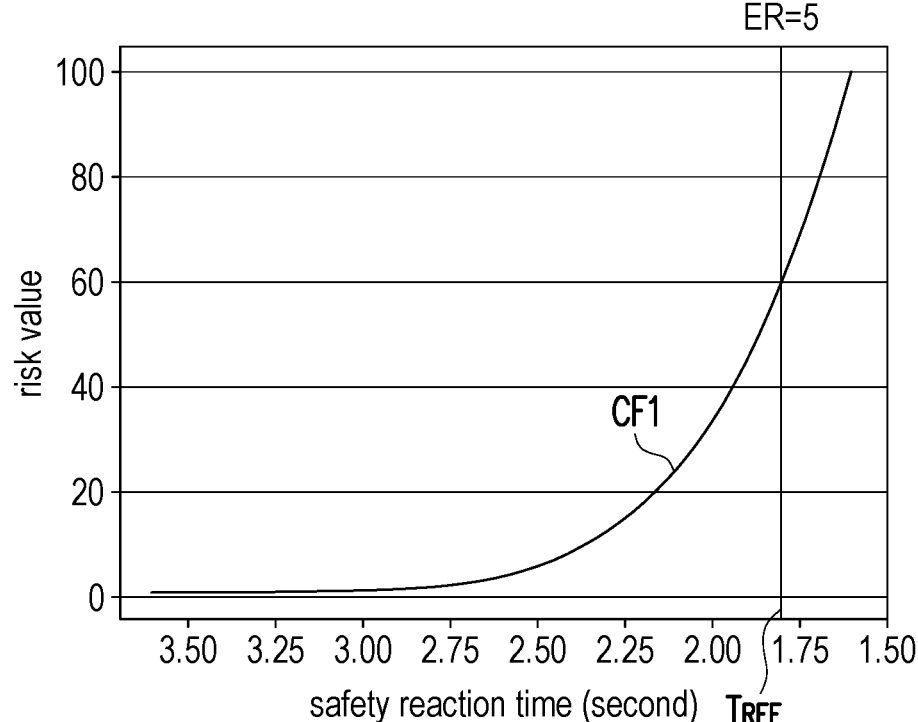
FIGS. 3A to 3F are schematic diagrams illustrating exponential functions with multiple exponential rates according to an embodiment of the disclosure.
Figure 3B:
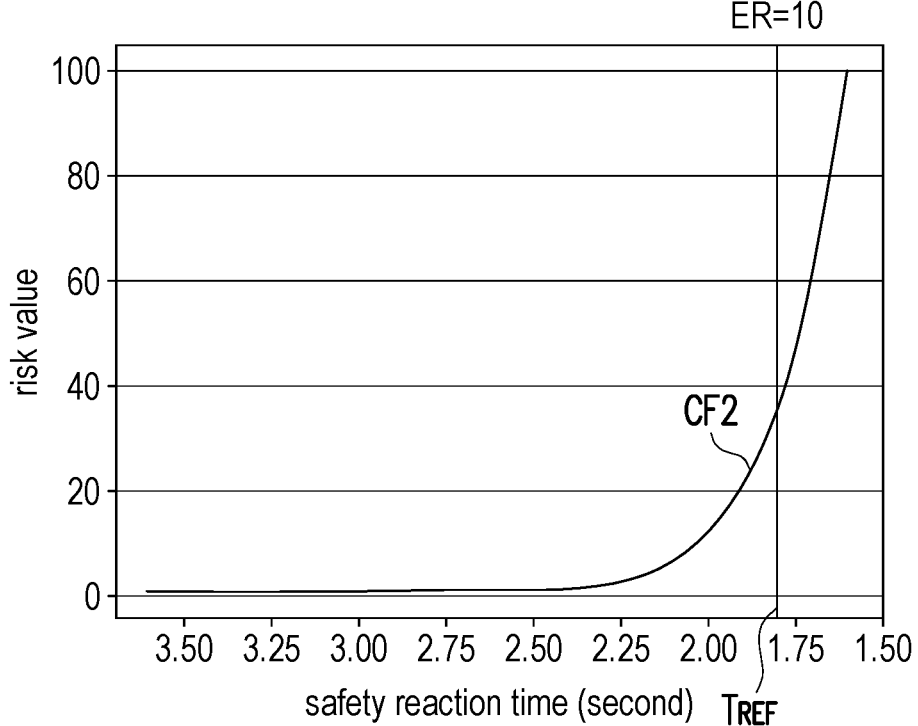

Referring to FIG. 3A and FIG. 3B, assuming that the input safety reaction time is a reference time $T_{REF}$ (for example, the value thereof is 1.8), the corresponding risk value of the exponential function CF1 is approximately 60, but the corresponding risk value of the exponential function CF2 is approximately 35. In other words, after the input value of the exponential function CF2 is lower than the reference time $T_{REF}$, the corresponding risk value thereof increases from 35 to 100. Compared with the exponential function CF1, the increase in the corresponding risk value is greater after the input value of the exponential function CF2 is lower than the reference time $T_{REF}$. However, the exponential function CF1 may significantly increase the risk value after the input value is less than approximately 2.75.

Figure 3C:
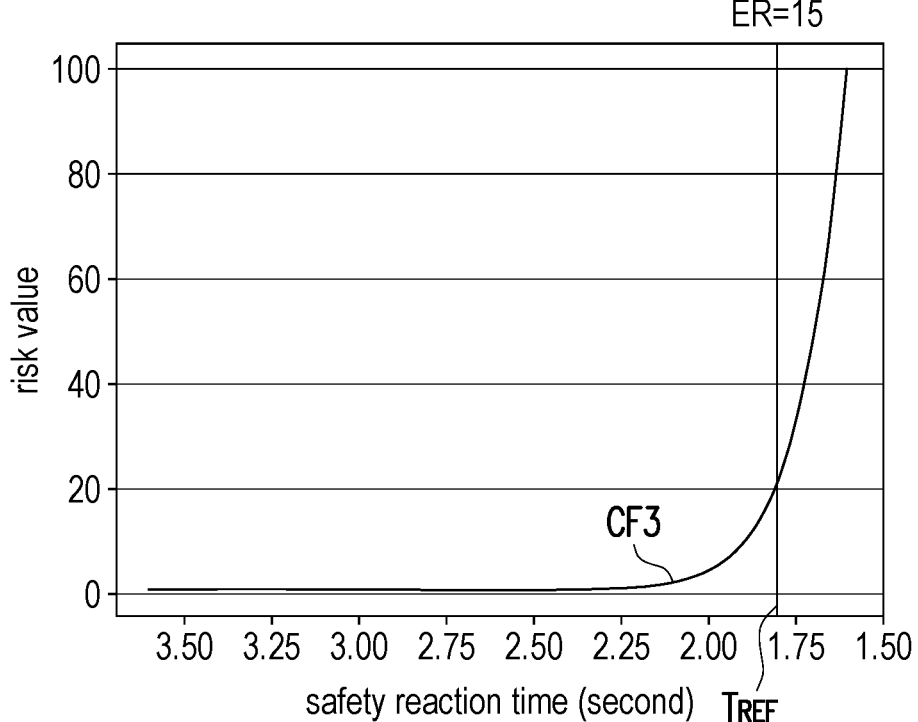
Figure 3D:
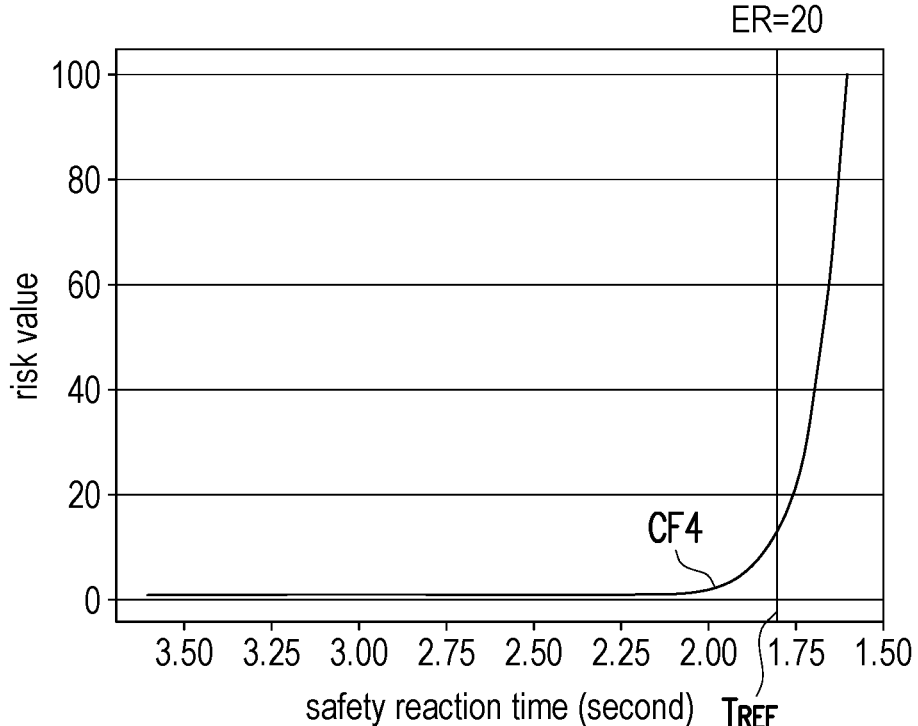

Referring to FIG. 3C and FIG. 3D, assuming that the input safety reaction time is the reference time $T_{REF}$ (for example, the value thereof is 1.8), the corresponding risk value of the exponential function CF3 is approximately 20, but the corresponding risk value of the exponential function CF4 is approximately 15. In other words, after the input value of the exponential function CF4 is lower than the reference time $T_{REF}$, the corresponding risk value thereof increases from 15 to 100. Compared with exponential function CF3, the increase in the corresponding risk value is greater after the input value of the exponential function CF4 is lower than the reference time $T_{REF}$. However, the exponential function CF3 may significantly increase the risk value after the input value is less than approximately 2.

Figure 3E:
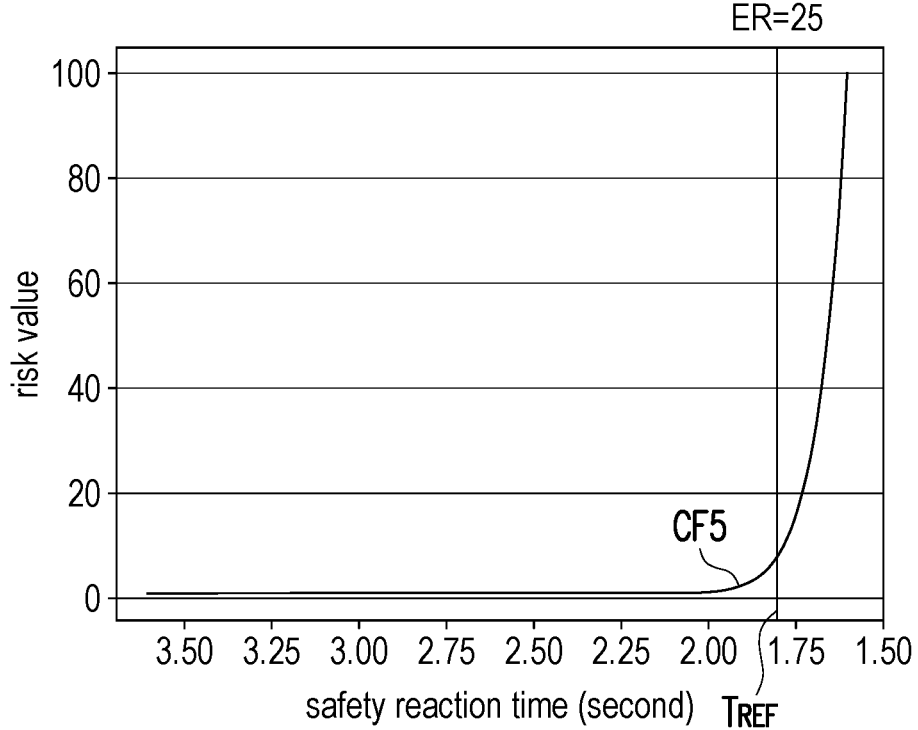
Figure 3F:
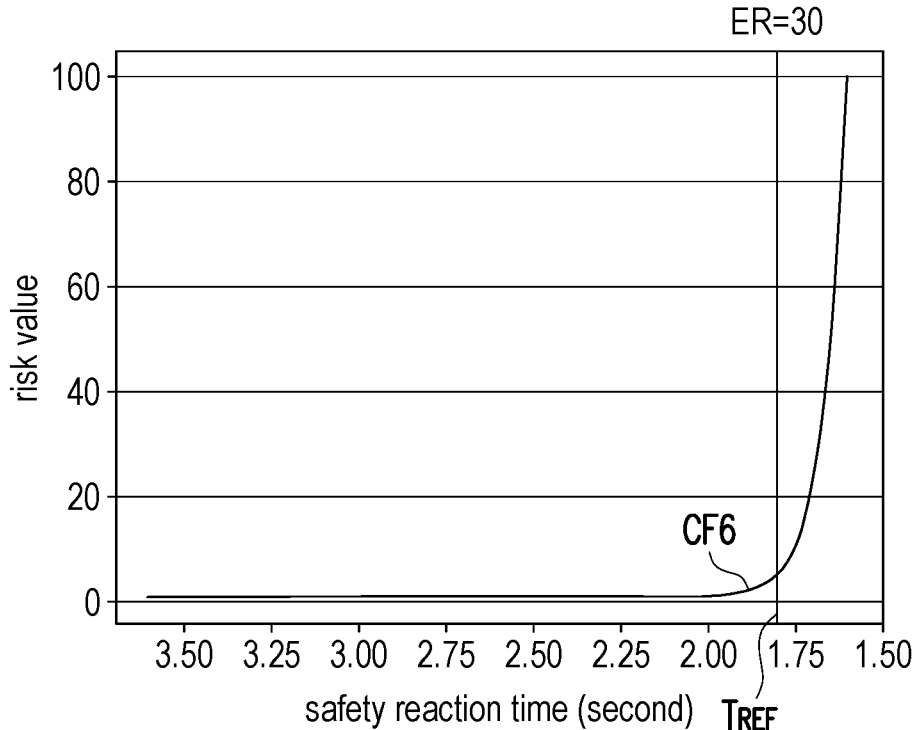

Referring to FIG. 3E and FIG. 3F, assuming that the input safety reaction time is the reference time $T_{REF}$ (for example, the value thereof is 1.8), the corresponding risk value of the exponential function CF5 is approximately 10, but the corresponding risk value of the exponential function CF6 is approximately 5. In other words, after the input value of the exponential function CF6 is lower than the reference time $T_{REF}$, the corresponding risk value thereof increases from 5 to 100. Compared with the exponential function CF5, the increase in the corresponding risk value is greater after the input value of the exponential function CF6 is lower than reference time $T_{REF}$. However, the exponential function CF5 may significantly increase the risk value after the input value is less than approximately 1.9.

In an embodiment, the processor 15 may set the exponential rate according to the physiological status. There are many types of physiological status, and different types may correspond to different exponential rates.

In an embodiment, in response to the physiological status being the unfocused eyes, the processor 15 may set the exponential rate as a first rate; in response to the physiological status being that the yawning frequency is higher than the corresponding threshold value, the processor 15 may set the exponential rate as a second rate, and the second rate is greater than or equal to the first rate; in response to the physiological status being the eye redness or the pupil constriction, the processor 15 may set the exponential rate as a third rate, and the third rate is greater than or equal to the second rate; in response to the physiological status being that the number of blinks is higher than the corresponding threshold value, the processor 15 may set the exponential rate as a fourth rate, and the fourth rate is greater than or equal to the third rate; in response to the physiological status belonging to the severely abnormal status, the processor 15 may set the safety reaction time to the lower limit time.

For example, if the physiological status is the unfocused eyes, the exponential rate is 5. As shown in FIG. 3A, the chance of triggering the alarm increases after the safety reaction time being less than 2.75 seconds. If the physiological status is that the yawning frequency is higher than the corresponding threshold value, the exponential rate is 10. As shown in FIG. 3B, the chance of triggering the alarm increases after the safety response time being less than 2.25 seconds. If the physiological status is the eye redness or the pupil constriction or that the number of blinks is higher than the corresponding threshold value, the exponential rate is 20. As shown in FIG. 3D, the chance of triggering the alarm increases after the safety reaction time being less than 2 seconds. If the physiological status belongs to the severely abnormal status, the safety reaction time is equal to the lower limit time, and the risk value is the maximum value (for example, 100, but not limited thereto).

Figure 4A:
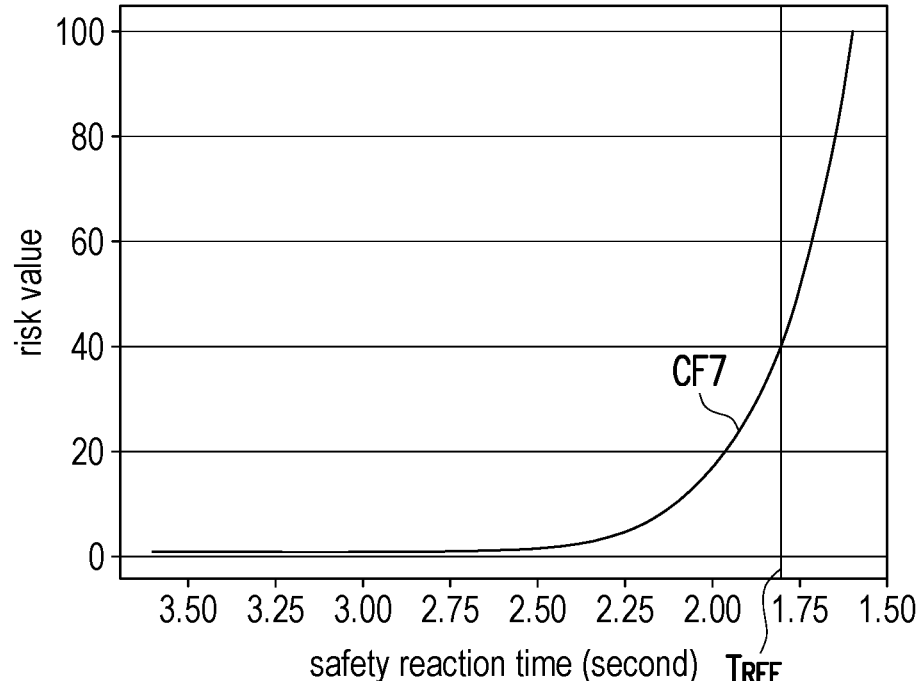
FIG. 4A and FIG. 4B are schematic diagrams illustrating exponential functions of different upper limit times according to an embodiment of the disclosure.
Figure 4B:
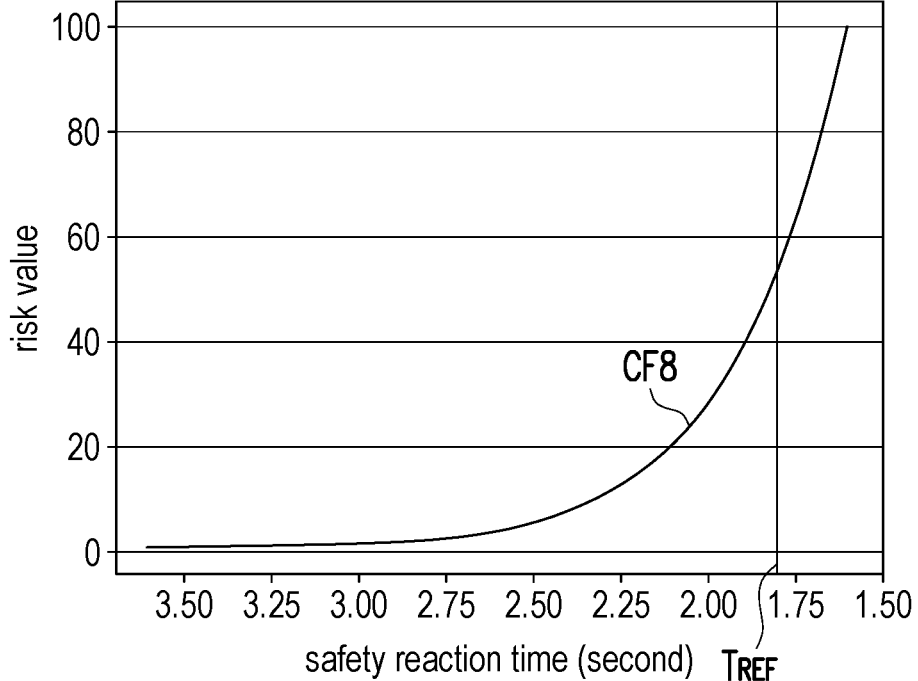

In addition to the exponential rate affecting the curve change of the exponential function, the upper limit time corresponding to the safety reaction time is also one of the influencing factors. For example, FIG. 4A and FIG. 4B are schematic diagrams illustrating exponential functions of different upper limit times according to an embodiment of the disclosure. Referring to FIG. 4A and FIG. 4B, the upper limit time of the exponential function CF7 is 6, and the upper limit time of the exponential function CF8 is 8. As the upper limit time increases, a usage range of the safety reaction time may increase, and the curve change of the exponential function may also be affected. For example, after the input value of the exponential function CF7 is lower than the reference time $T_{REF}$, the corresponding risk value increases from 40 to 100. Compared with the exponential function CF8, the increase of the corresponding risk value is greater after the input value of the exponential function CF7 is lower than the reference time $T_{REF}$. However, the exponential function CF8 may significantly increase the risk value after the input value is less than approximately 2.75.

After applying the above numerical settings in FIG. 3A to FIG. 3F, the risk value may be simplified as follows:

$$I_{Safe} = 1 + \left( 99 \times \left( 1 - \frac{T_{Cur} - 1.6}{3.6 - 1.8} \right)^{ER} \right) \qquad (2)$$

First of all, regarding $$\frac{T_{Cur} - 1.6}{3.6 - 1.8}$$

in formula (1), the part is actually a linear transformation and normalizes a numerical range of the safety reaction time to between 0 and 1.

A time range of $[T_{MIN}, T_{MAX}]$ is mapped from the original [1.6, 3.6] to [0, 1]. For example, when $T_{Cur}$=1.8, the value obtained by mapping is 0; when $T_{Cur}$=3.6, the value obtained by mapping is 1.

$[T_{MIN}, T_{MAX}]$ is arranged in flashback/inversion into $[T_{MAX}, T_{MIN}]$, so $$\frac{T_{Cur} - 1.6}{3.6 - 1.8}$$

is subtracted from the normalized maximum value 1 to reverse the time range thereof. That is, the time range changes from [0, 1] to [1, 0].

Then, $$(1 - \frac{T_{Cur} - 1.6}{3.6 - 1.8})$$

is raised to the power of ER, so that the numerical range of $[T_{MAX}, T_{MIN}]$ remains in [1, 0], but the values in this range are exponentially mapped to a non-linear range. For example, when the exponential rate ER is greater than 1, original values close to 0 become closer to 0 after being mapped, and original values close to 1 become closer to 1 after being mapped.

Finally, since the range interval of the risk value is defined as [1, 100], $$\left( 1 - \frac{T_{Cur} - T_{MIN}}{T_{MAX} - T_{MIN}} \right)^{ER}$$

is multiplied by 99 so that the range interval of the value becomes [0, 99], and then 1 is added to the obtained value.

Therefore, the formula (2) maps the range of $[T_{MAX}, T_{MIN}]$ from [3.6, 1.6] to [1, 100]. In addition, in the process of the safety reaction time $T_{Cur}$ decreasing from 3.6 to 1.6, the value of the risk value $I_{safe}$ exponentially increases from 1 to 100; when the safety reaction time $T_{Cur}$ decreases downward below 1.8, the value of the risk value $I_{safe}$ increases rapidly.

In another embodiment, the cutoff function is not limited to the exponential function and may be a function with the same or similar characteristics.

In an embodiment, the processor 15 may send the alarm according to the risk value through the alarm processing module 143. Specifically, the amount of the risk value determines whether the alarm is triggered. The greater the risk value is, the higher the chance of triggering the alarm is; the less the risk value is, the lower the chance of triggering the alarm is. In an embodiment, the processor 15 accumulates the risk values at multiple consecutive time points and triggers the alarm based on a statistical value of the risk values (e.g., a sum or an arithmetic mean). For example, the greater the statistical value of the risk values is, the higher the chance of triggering the alarm is; the less the statistical value of the risk values is, the lower the chance of triggering the alarm is.

In an embodiment, the processor 15 may send an auditory-related alarm (for example, an alarm sound or a reminder voice content) through a speaker; send a visual-related alarm through a display (for example, flashing warning lights or a presentation of a reminder icon); send text, symbol, or pattern-related alarms to a device of relevant units. In an embodiment, the processor 15 may slow down the vehicle, change to a slow lane, or stop the vehicle through the in-vehicle system.

Figure 5:
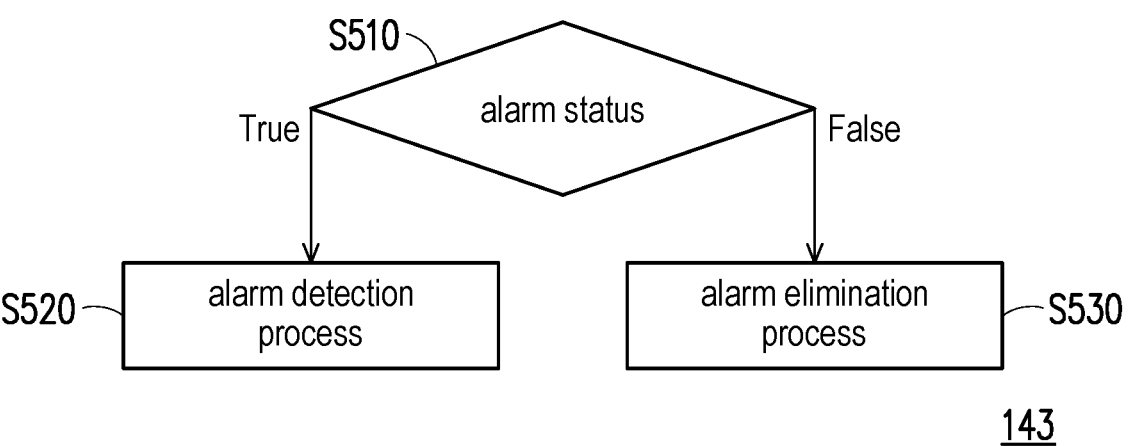
FIG. 5 is a flow chart illustrating an alarm mechanism of an alarm processing module according to an embodiment of the disclosure.

FIG. 5 is a flow chart illustrating an alarm mechanism of the alarm processing module 143 according to an embodiment of the disclosure. Referring to FIG. 5, an alarm status is determined by the alarm processing module 143 (step S510). The alarm status includes "True/Yes" and "False/No". "True/Yes" means the alarm is in a sending process, and "False/No" means to abort/stop/interrupt/eliminate the alarm.

If the alarm status is "False/No" (for example, $f_{alarm}$=False, $f_{alarm}$ is the alarm status), an alarm detection process is executed by the alarm processing module 143 (step S520). At this time, the driving risk evaluation system 10 does not send the alarm, and the alarm processing module 143 detects whether it is necessary to send the alarm. On the other hand, if the alarm status is "True/Yes" (for example, $f_{alarm}$=True), an alarm elimination process is executed by the alarm processing module 143 (step S530). At this time, the driving risk evaluation system 10 may detect an abnormal physiological status and/or the vehicle being at an unsafe distance/speed. Therefore, the driving risk evaluation system 10 is continuously sending the alarm. On the other hand, the alarm processing module 143 continues to determine whether the physiological status and/or the vehicle status reaches a condition for stopping sending the alarm. If the condition for stopping sending the alarm is met, the alarm processing module 143 may reset the alarm status $f_{alarm}$ to False; if the condition for stop sending the alarm has not been met, the alarm status $f_{alarm}$ remains True (i.e., continuously sending the alarm).

Figure 6:
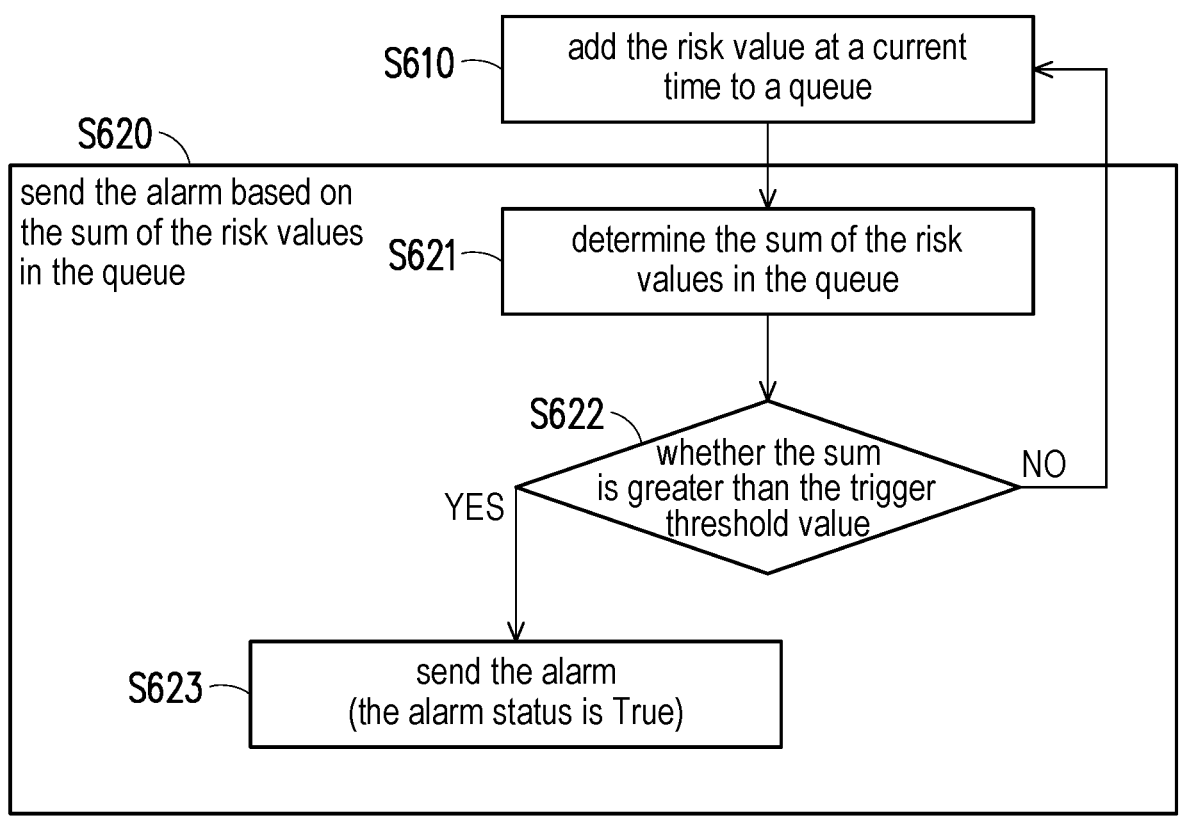
FIG. 6 is a flow chart of an alarm detection process according to the first embodiment of the disclosure.

FIG. 6 is a flow chart of the alarm detection process S520 according to the first embodiment of the disclosure. Referring to FIG. 6, the risk value at the current time may be added to a queue by the processor 15 (step S610). The risk value at the current time refers to the risk value derived from the safety reaction time at the current time point. The queue may further includes the risk value from one or more previous times. The risk value at the previous time refers to the risk value derived from the safety reaction time at the previous time point. The previous time is earlier than the current time. The processor 15 may set a maximum capacity of the queue. For example, 10, 20, or 50 risk values. The queue is based on a first-in-first-out principle. In response to the number of the risk values in the queue being greater than the maximum capacity of the queue, a risk value at a head end of the queue is output (assuming that the most recent/latest risk value is input from a tail of the queue).

Figure 7:
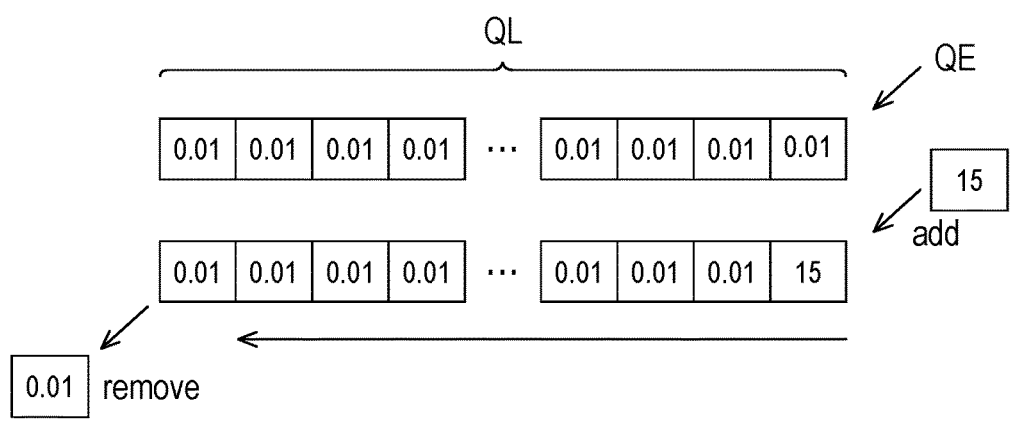
FIG. 7 is a schematic diagram illustrating a queue according to an embodiment of the disclosure.

FIG. 7 is a schematic diagram illustrating a queue QE according to an embodiment of the disclosure. Referring to FIG. 7, the queue QE has a maximum capacity QL. For example, 30, 50, or 60. The queue QE at the top of FIG. 7 has not yet been added the risk value of 15. The queue QE at the bottom of FIG. 7 is added the risk value of 15 at a right end, and outputs the risk value of 0.01 at a far left end. The processor 15 may delete, ignore, or retain the risk value output by the queue QE.

In an embodiment, the value of the maximum capacity QL is related to the frequency of calculating the risk value and the frequency of monitoring the vehicle status or the physiological status. For example, the product of two frequencies (in units of times per second).

Referring to FIG. 6, the alarm is sent by the processor 15 according to the sum of the risk values in the queue (step S620). Specifically, the sum of the risk values in the queue may be determined by the processor 15 (step S621). That is, the values of all risk values in the queue are added up. The sum of the risk values in the queue may be compared with the trigger threshold value by the processor 15, and whether the sum is greater than the trigger threshold value is determined (step S622).

In response to the sum of the risk values in the queue being greater than the trigger threshold value, the alarm may be sent by the processor 15 (step S623) and the alarm status is changed from "False" to "True". In response to the sum of the risk values in the queue being not greater than the trigger threshold value, the alarm status is remained "False" and the risk value at the current time is added to the queue at the next time point (step S610).

Figure 8:
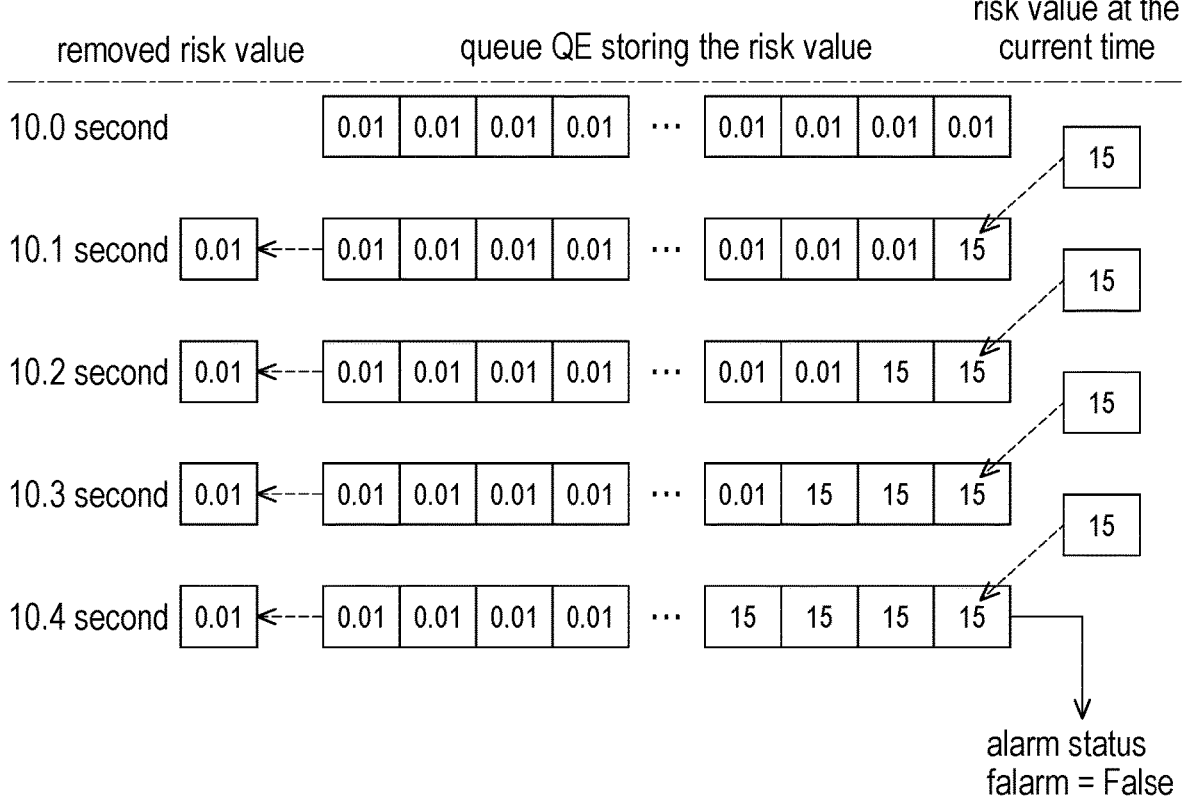
FIG. 8 is a schematic diagram of an application scenario illustrating an order of the risk values in the queue.

FIG. 8 is a schematic diagram of an application scenario illustrating an order of the risk values in the queue. Referring to FIG. 8, Table (1) shows a corresponding relationship between speed, distance, and time in the application scenario:

TABLE 1

| | | | |
|---|---|---|---|
| speed: 80 kilometers per hour | speed: 80 kilometers per hour | speed: 60 kilometers per hour | speed: 80 kilometers per hour |
| distance: 60 meters | distance: 40 meters | distance: 40 meters | distance: 60 meters |
| 1 to 10 seconds | 10 to 12 seconds | 12 to 15 seconds | 15 seconds and after |

In the first 10 seconds, the tired driver maintained the speed at 80 kilometers per hour and maintained the distance of 60 meters to a vehicle in front. After 10 seconds, the distance to the vehicle in front decreased to 40 meters due to a deceleration of the vehicle in front. At this time, the alarm sounded. After 2 seconds, the driver slowed down to 60 kilometers. After another 3 seconds, the distance to the vehicle in front returned to 60 meters, and the speed was 80 kilometers per hour. In addition, assuming that the trigger threshold value is 60, the risk value is calculated every 0.1 seconds, the physiological and/or vehicle status in the last 5 seconds is monitored, and the maximum capacity of the queue is 50.

Since the alarm status at the beginning is "False", the alarm detection process S520 is executed. A total of 100 risk values are calculated during the first 10 seconds. Since the speed of the vehicle has been maintained at 80 kilometers per hour, the safety reaction time may be calculated as 60/(80*1000/3600)=2.7 seconds. It is assumed that the risk value of the corresponding output of the cutoff function is 0.01. Therefore, the risk value of 0.01 is stored in the queue QE with a maximum capacity of 50 values. If the maximum capacity has been reached, the processor 15 may cyclically remove a first element in the queue QE (for example, the risk value located at the far left end of the figure) and add a new element at the tail (for example, the risk value located at the far right end of the figure). Therefore, at the 10 second, the sum of all risk values of the queue QE is 0.01×50=0.5 and is not yet greater than the trigger threshold value of the alarm (i.e., the alarm is not triggered).

In the next detection phase (10 seconds+0.1 seconds=10.1 seconds), since the distance between the vehicle and another vehicle suddenly decreases to 40 meters, the safety reaction time is reduced to 40/(80*1000/3600)=1.8 seconds, and the risk value of the corresponding output of the cutoff function is 15. The risk value newly added at the end of the queue QE is 15. At this time, the sum of all risk values in the queue QE is 0.01×49+15=15.49, but still less than the trigger threshold value of the alarm, so the alarm is not triggered. After filling in the risk value of 15 to the end of the queue QE for three consecutive times, the sum of all risk values in the queue QE becomes 0.01×49+15*4=60.49 and is greater than the trigger threshold value of the alarm, so the alarm is sent and the alarm status is changed from "False" to "True". It may be seen that if the value of the risk value is less (for example, less than 20 or less than 30, and corresponds to the greater safety reaction time), it may be necessary to accumulate the risk value for a period of time (for example, 0.4 or 0.5 seconds) before the alarm status may be triggered.

Figure 10:
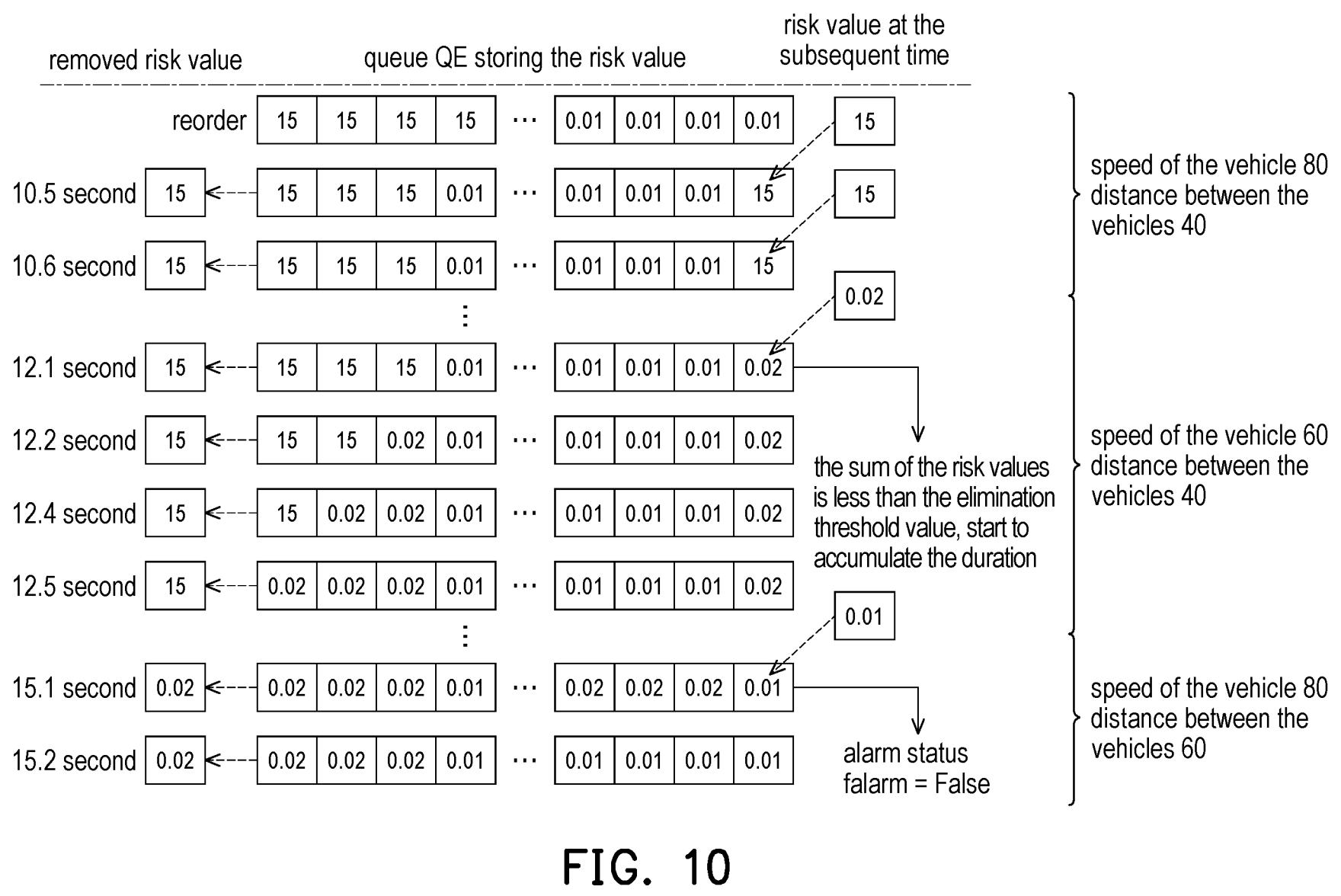

FIG. 9 is a flow chart of the alarm elimination process S530 according to the first embodiment of the disclosure. Referring to FIG. 9, the risk values in the queue may be ordered by the processor 15 according to a value magnitude of the risk values (step S910). If the queue has the head end thereof output the risk value exceeding the maximum capacity, then all risk values in the queue are reordered from large to small starting from the head end of the queue. For example, FIG. 10 is a schematic diagram of an application scenario illustrating an order of the risk values in the queue. Referring to FIG. 8 and FIG. 10, the alarm is triggered at the 10.4 second in FIG. 8. By reordering the risk values in the queue corresponding to the 10.4 second, the order of the queue QE in a top column as shown in FIG. 10 may be obtained. 15 is the maximum value, and thus being ordered at the head end of queue QE (the far left end in the figure).

Referring to FIG. 9, the risk value at a subsequent time may be added by the processor 15 to the queue (step S920). The subsequent time is later than the current time. That is to say, at a subsequent time point, the risk value continues to be determined, and the determined risk value is sequentially added to the queue. It should be noted that the subsequent time is used to distinguish the current time. When the subsequent time arrives, the subsequent time is the current time.

The alarm may be eliminated by the processor 15 according to the sum of the risk values in the queue (step S930). Specifically, the sum of the risk values in the queue may be determined by the processor 15 (step S631). That is, the values of all risk values in the queue are added up. The sum of the risk values in the queue may be compared by the processor 15 with an elimination threshold value, and whether the sum is less than the elimination threshold value is determined (step S932).

In response to the sum being less than the elimination threshold value, whether a duration for which the sum of the subsequent times is less than the elimination threshold value is greater than a time threshold value may be determined by the processor 15 (step S933). As long as the sum of the subsequent times is less than the elimination threshold value, the duration is accumulated. That is to say, within a time interval corresponding to the duration, the sum of all risk values in the queue is less than the elimination threshold value. Alternatively, the processor 15 may accumulate an elimination count as long as the sum of the subsequent times is less than the elimination threshold value.

In response to the duration being greater than the time threshold value, the alarm is eliminated (step S934), and the alarm status is changed from "True" to "False". Alternatively, in response to the elimination count being greater than a count threshold value (for example, 3, 5, or 10 times), the alarm is eliminated (step S934), and the alarm status is changed from "True" to "False".

In response to the sum of the risk values in the queue being not less than the elimination threshold value, the alarm status is maintained as "True", the risk values of the queue are reordered (step S910), and the risk value at the current time is added to the queue at the next time point (step S920). In addition, in response to the sum of the risk values in the queue being not less than the elimination threshold value, the alarm status is maintained as "True", the risk values in the queue are reordered (step S910), and the risk value at the current time is added to the queue at the next time point (step S920).

In another embodiment, in response to the sum of the risk values in the queue being less than the elimination threshold value, the processor 15 may also directly eliminate the alarm.

Referring to FIG. 10, starting from the 12.1 second, the speed of the vehicle changes to 60 kilometers per hour, the safety reaction time is 40/(60*1000/3600)=2.4 seconds, and the corresponding output risk value of the cutoff function is 0.02. At this time, the sum of all risk values of the queue QE is 0.01×46+0.02×1+15×3=45.48 and is less than the elimination threshold value of the alarm (for example, 60). Next, the elimination count of which the sum is less than the elimination threshold value of the alarm begins to be accumulated. When the time reaches the 15.1 second and the elimination count reaches a counting threshold value (for example, 3 times), the processor 15 sets the alarm status to "No" and lifts/eliminates the alarm.

After 15.2 seconds, since the alarm status is "No", the step returns to the alarm detection process S520.

Figure 11:
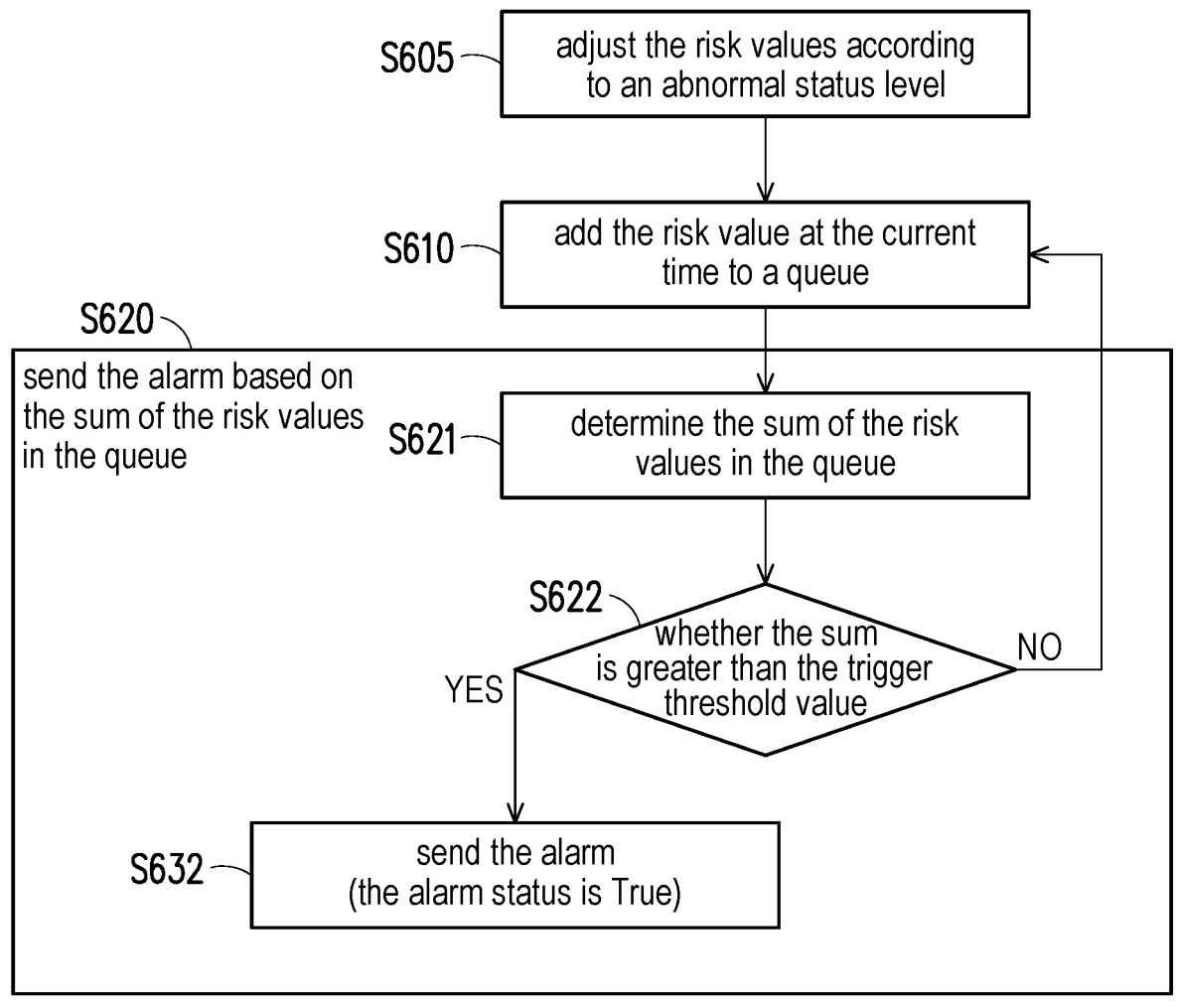
FIG. 11 is a flow chart of the alarm detection process according to the second embodiment of the disclosure.

FIG. 11 is a flow chart of the alarm detection process S520 according to the second embodiment of the disclosure. Referring to FIG. 11, the difference from the first embodiment shown in FIG. 6 is that before adding the risk values at the current time to the queue, the risk values are further adjusted by the processor 15 according to an abnormal status level (step S605). The abnormal status level is related to the physiological status of driving the vehicle. The physiological status is as described above and will not be repeated here. For example, the adjusted risk value is the product of the original weight value and the weight value corresponding to the abnormal status level. The abnormal status level is divided into 5 levels from mild to severe. The abnormal status levels 3 to 5 are defined as the severely abnormal status and required to send the alarm immediately. Therefore, the weight value corresponding to levels 3 to 5 may be set higher than the trigger threshold value of the alarm. If an alarm trigger time of Level 2 is to be shorten by half compared to the alarm trigger time of Level 1, the weight value of Level 2 may be set to twice the weight value of Level 1. The weight value of level 1 is assumed to be defined as 1. However, the weight value corresponding to the abnormal status level may still be adjusted according to actual needs.

Figure 12:
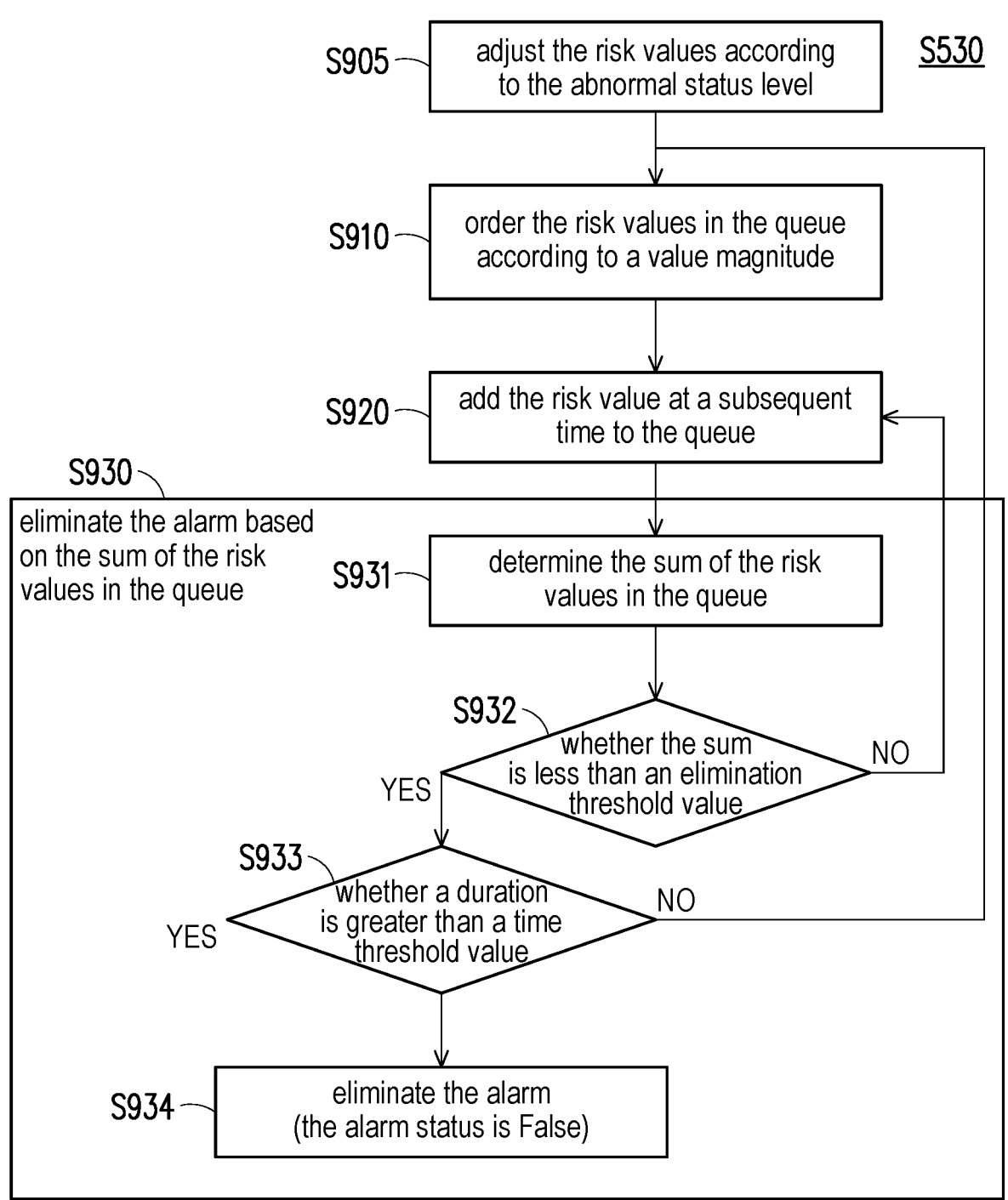
FIG. 12 is a flow chart of the alarm elimination process according to the second embodiment of the disclosure.

FIG. 12 is a flow chart of the alarm elimination process according to the second embodiment of the disclosure. Referring to FIG. 12, the difference from the first embodiment shown in FIG. 9 is that before ordering the risk values in the queue according to the value magnitude, the risk values are further be adjusted by the processor 15 according to the abnormal status level (step S905). The abnormal status level is as described in FIG. 11 above, and will not be repeated here.

To sum up, in the driving monitoring method and driving risk evaluation system of the embodiment of the disclosure, the safety reaction time based on the speed and the distance is converted into the risk value corresponding to a degree of emergency according to the characteristics of the cutoff function. The risk values at multiple time points are temporarily stored through the queue. The sum of multiple risk values in the queue determines whether to trigger the alarm or eliminate the alarm. In this way, the driver may be reminded in a timely manner at an appropriate distance between vehicles without disturbing the driver too frequently.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A driving monitoring method, comprising:
determining a safety reaction time relative to a vehicle driving status;
evaluating a risk value through inputting the safety reaction time into a cutoff function, wherein the greater the safety reaction time is, the less the corresponding risk value relative to the cutoff function is, and the less the safety reaction time is, the greater the corresponding risk value relative to the cutoff function is, and the cutoff function is an exponential function;
setting an upper limit time and a lower limit time for the safety reaction time;
setting a range interval for the risk value;
defining the exponential function according to the upper limit time, the lower limit time, and the range interval, wherein the upper limit time and the lower limit time are configured to normalize the safety reaction time in the exponential function, and the range interval is related to a frequency of detecting the vehicle driving status; and
slowing down a vehicle, changing to a slow lane, or stopping the vehicle through an in-vehicle system according to the risk value.

2. The driving monitoring method according to claim 1, wherein the exponential function is:

$$I_{Safe} = O_{MIN} + \left( (O_{MAX} - O_{MIN}) \times \left( 1 - \frac{T_{Cur} - T_{MIN}}{T_{MAX} - T_{MIN}} \right)^{ER} \right)$$

$T_{Cur}$ is the safety reaction time, $T_{MIN}$ is the lower limit time, $T_{MAX}$ is the upper limit time, ER is an exponential rate, $O_{MAX}$ is an upper limit of the range interval, $O_{MIN}$ is a lower limit of the range interval, and $I_{Safe}$ is the risk value.

3. The driving monitoring method according to claim 2, further comprising:
detecting a physiological status, wherein the physiological status is related to a behavioral ability to drive a vehicle; and
setting the exponential rate according to the physiological status.

4. The driving monitoring method according to claim 3, wherein setting the exponential rate according to the physiological status comprises:
setting the exponential rate as a first rate in response to the physiological status being unfocused eyes;
setting the exponential rate as a second rate in response to the physiological status being that a yawning frequency is higher than a corresponding threshold value, wherein the second rate is greater than or equal to the first rate;
setting the exponential rate as a third rate in response to the physiological status being eye redness or pupil constriction, wherein the third rate is greater than or equal to the second rate;
setting the exponential rate as a fourth rate in response to the physiological status being that a number of blinks is higher than the corresponding threshold value, wherein the fourth rate is greater than or equal to the third rate; and
setting the safety reaction time to the lower limit time in response to the physiological status belonging to a severely abnormal status.

5. The driving monitoring method according to claim 1, wherein after evaluating the risk value, the driving monitoring method further comprises:
adding the risk value at a current time to a queue, wherein the queue further comprises the risk value of at least one previous time, the at least one previous time is earlier than the current time, and one of the risk value in the queue is output in response to the number of the risk values in the queue being greater than a maximum capacity of the queue; and
sending an alarm according to a sum of the risk values in the queue.

6. The driving monitoring method according to claim 1, further comprising:
adjusting the risk value according to an abnormal status level, wherein the abnormal status level is related to a physiological status of driving a vehicle.

7. The driving monitoring method according to claim 5, wherein sending the alarm according to the sum of the risk values in the queue comprises:
comparing the sum of the risk values in the queue with a trigger threshold value; and
sending the alarm in response to the sum of the risk values in the queue is greater than the trigger threshold value.

8. The driving monitoring method according to claim 5, further comprising:
ordering the risk values in the queue according to a value magnitude of the risk values;

adding the risk value at a subsequent time to the queue, wherein the subsequent time is later than the current time; and eliminating the alarm according to the sum of the risk values in the queue.

9. The driving monitoring method according to claim 7, wherein eliminating the alarm according to the sum of the risk values in the queue comprises:

comparing the sum of the risk values in the queue with an elimination threshold value; and eliminating the alarm in response to the sum of the risk values in the queue being less than the elimination threshold value.

10. The driving monitoring method according to claim 1, wherein the vehicle driving status comprises a speed of a vehicle and a distance between the vehicle and another vehicle.

11. A driving risk evaluation system, comprising:

a sensor, detecting the vehicle driving status;

a storage, storing a program code; and a processor, coupled to the sensor and the storage, loading the program code and executing:

determining a safety reaction time relative to the vehicle driving status;

evaluating a risk value through inputting the safety reaction time into a cutoff function, wherein the greater the safety reaction time is, the less the corresponding risk value relative to the cutoff function is, and the less the safety reaction time is, the greater the corresponding risk value relative to the cutoff function is, and the cutoff function is an exponential function;

setting an upper limit time and a lower limit time for the safety reaction time;

setting a range interval for the risk value;

defining the exponential function according to the upper limit time, the lower limit time, and the range interval, wherein the upper limit time and the lower limit time are configured to normalize the safety reaction time in the exponential function, and the range interval is related to a frequency of detecting the vehicle driving status; and slowing down a vehicle, changing to a slow lane, or stopping the vehicle through an in-vehicle system according to the risk value.

12. The driving risk evaluation system according to claim 10, wherein the exponential function is:

$$I_{Safe} = O_{MIN} + \left( (O_{MAX} - O_{MIN}) \times \left( 1 - \frac{T_{Cur} - T_{MIN}}{T_{MAX} - T_{MIN}} \right)^{ER} \right)$$

$T_{Cur}$ is the safety reaction time, $T_{MIN}$ is the lower limit time, $T_{MAX}$ is the upper limit time, ER is an exponential rate, $O_{MAX}$ is an upper limit of the range interval, $O_{MIN}$ is a lower limit of the range interval, and $I_{Safe}$ is the risk value.

13. The driving risk evaluation system according to claim 12, wherein the processor further executes:

detecting a physiological status, wherein the physiological status is related to a behavioral ability to drive a vehicle, and the vehicle driving status comprises a speed of a vehicle and a distance between the vehicle and another vehicle; and setting the exponential rate according to the physiological status.

14. The driving risk evaluation system according to claim 13, wherein the processor further executes:

setting the exponential rate as a first rate in response to the physiological status being unfocused eyes;

setting the exponential rate as a second rate in response to the physiological status being that a yawning frequency is higher than a corresponding threshold value, wherein the second rate is greater than or equal to the first rate;

setting the exponential rate as a third rate in response to the physiological status being eye redness or pupil constriction, wherein the third rate is greater than or equal to the second rate;

setting the exponential rate as a fourth rate in response to the physiological status being that a number of blinks is higher than the corresponding threshold value, wherein the fourth rate is greater than or equal to the third rate; and setting the safety reaction time to the lower limit time in response to the physiological status belonging to a severely abnormal status.

15. The driving risk evaluation system according to claim 11, wherein the processor further executes:

adding the risk value at a current time to a queue, wherein the queue further comprises the risk value of at least one previous time, the at least one previous time is earlier than the current time, and one of the risk values in the queue is output in response to a number of the risk values in the queue being greater than a maximum capacity of the queue; and sending an alarm according to a sum of the risk values in the queue.

16. The driving risk evaluation system according to claim 11, wherein the processor further executes:

adjusting the risk value according to an abnormal status level, wherein the abnormal status level is related to a physiological status of driving a vehicle.

17. The driving risk evaluation system according to claim 15, wherein the processor further executes:

comparing the sum of the risk values in the queue with a trigger threshold value;

sending the alarm in response to the sum of the risk values in the queue being greater than the trigger threshold value;

comparing the sum of the risk values in the queue with an elimination threshold value; and eliminating the alarm in response to the sum of the risk values in the queue being less than the elimination threshold value.

18. The driving risk evaluation system according to claim 15, wherein the processor further executes:

ordering the risk values in the queue according to a value magnitude of the risk values;

adding the risk value at a subsequent time to the queue, wherein the subsequent time is later than the current time; and eliminating the alarm according to the sum of the risk values in the queue.

* * * * *